United States Patent
Keith, Jr. et al.

(10) Patent No.: US 11,178,969 B2
(45) Date of Patent: Nov. 23, 2021

(54) ADAPTORS WITH CAVITIES

(71) Applicant: Hewlett-Packard Development Company, L.P., Spring, TX (US)

(72) Inventors: Marshall Dale Keith, Jr., Tomball, TX (US); Alyssa O'Reilly, Fate, TX (US); Bruce David Michelson, Boca Raton, FL (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/723,978

(22) Filed: Dec. 20, 2019

(65) Prior Publication Data
US 2021/0186214 A1 Jun. 24, 2021

(51) Int. Cl.
*G06F 1/16* (2006.01)
*A47B 97/00* (2006.01)

(52) U.S. Cl.
CPC ............ *A47B 97/00* (2013.01); *G06F 1/1607* (2013.01); *A47B 2097/005* (2013.01)

(58) Field of Classification Search
CPC .. G06F 1/1607; A47B 97/00; A47B 2097/005
See application file for complete search history.

(56) References Cited

U.S. PATENT DOCUMENTS

| | | | | |
|---|---|---|---|---|
| 7,232,098 | B2* | 6/2007 | Rawlings | F16M 11/041 248/121 |
| 8,286,977 | B2 | 10/2012 | Butler et al. | |
| 8,317,146 | B2* | 11/2012 | Jung | G06F 1/1601 248/286.1 |
| 9,835,288 | B1* | 12/2017 | Matthews | F16M 11/041 |
| 2002/0011544 | A1* | 1/2002 | Bosson | F16M 11/041 248/121 |
| 2009/0134285 | A1* | 5/2009 | Huang | F16M 11/2014 248/124.1 |
| 2009/0257201 | A1* | 10/2009 | Burge | F16M 13/02 361/729 |

FOREIGN PATENT DOCUMENTS

| | | |
|---|---|---|
| DE | 102017106650 | 10/2017 |
| JP | 2010218525 | 9/2010 |

OTHER PUBLICATIONS

MOUNT-VESA01 VESA bracket for intel NUC.
VESA mount adapter plate for intel NUC.

* cited by examiner

*Primary Examiner* — Rockshana D Chowdhury
(74) *Attorney, Agent, or Firm* — Brooks Cameron & Huebsch PLLC

(57) ABSTRACT

In some examples an adaptor can comprise a first surface to be coupled to an enclosure of a first device, second surface opposite to the first surface to be coupled to an enclosure of a second device, and a cavity extending through the adapter to allow a mounting device to pass through the second surface and the first surface to be coupled to the enclosure of the first device.

15 Claims, 3 Drawing Sheets

ADAPTORS WITH CAVITIES

BACKGROUND

An adaptor or adaptor plate can include a device that can connect a first device to a second device when the first device and second device do not include a common aperture pattern for connecting the devices together. Adaptors can be utilized to couple peripheral devices to computing devices and/or computing devices to peripheral devices.

DETAILED DESCRIPTION

Figure 1A:
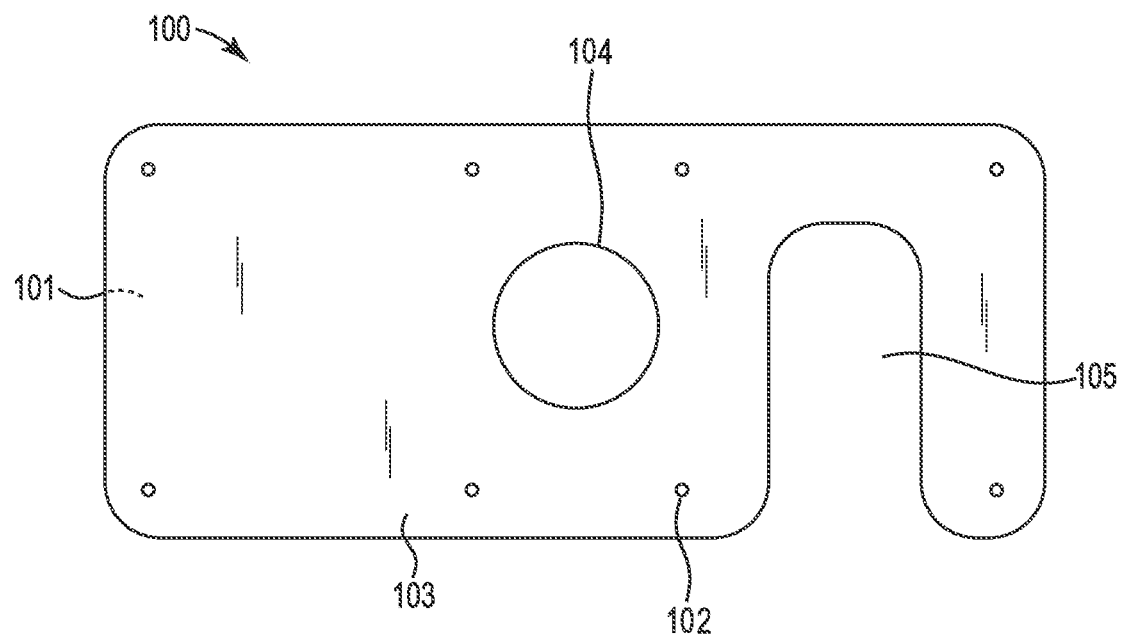
FIG. 1A illustrates an example of an adaptor with a cavity consistent with the disclosure.

In some examples, a connecting mechanism can be utilized to couple a first device to a second device. A connecting mechanism can include a mounting plate, a bracket, a cable, an adaptor, etc. As used herein, the term "adaptor" refers to a device that can be utilized to couple two devices together that would normally not share an aperture pattern or other connecting mechanism that can be utilized to couple the two devices together. For example, an adaptor can include a plate or adaptor plate that can include a first connecting mechanism to couple to a first device and a second connecting mechanism to couple to a second device. In this way, the adaptor can couple the first device to the second device.

In previous examples, an adaptor or adaptor plate can replace a connecting mechanism of a first device or second device when coupling the first device to the second device. These previous examples can prevent some connecting mechanisms to be utilized when the first device is coupled to the second device. For example, an articulating arm can be utilized to couple a monitor to a workstation (e.g., work cart, desk, etc.). In this example, an adaptor could be utilized to couple a computing device or peripheral device to the monitor. However, in some previous examples, the adaptor may limit the functionality of the articulating arm or become too large when installed. Thus, the present disclosure relates to adaptors with cavities that can be utilized with existing connecting mechanisms when the adaptor is utilized to couple additional devices to a particular device.

An adaptor, according to the disclosure, can be utilized to couple a device (e.g., computing device, peripheral device, thin client, mini desktop, etc.) to a monitor or other device while the monitor is coupled to a connecting mechanism through a cavity. In this way, the device can be coupled to the monitor while the monitor is coupled to a workstation (e.g., desk, medical cart, etc.) through a connecting mechanism as described herein. In some examples, the adaptor can include a cavity located on a side of the adaptor. As used herein, a cavity can include an aperture that extends from an edge of the adaptor to an interior position of the adaptor. The cavity can allow a connecting mechanism (e.g., connection arm, monitor stand, monitor mount, etc.) to pass through and be directly coupled to a monitor or other device coupled to the adaptor. As used herein, the term "couple" refers to physically connecting or attaching devices through a connecting mechanism (e.g., screws, bolts, etc.).

In some examples, the adaptor with a cavity extending through the adapter can include a first surface and a second surface. The second surface can be opposite to the first surface. In some examples, the first surface of the adaptor can be coupled to an enclosure of the first device. For example, the first surface can be coupled to the back portion of a computing device monitor. In some examples, the second surface of the adaptor can be coupled to an enclosure of the second device. For example, the second surface can be coupled to an enclosure of a thin client, mini desktop, other computing devices, etc.

As used herein, the term "mounting device" refers to a connecting mechanism, different from the first device and the second device, that can be positioned through a cavity of the adaptor and connect the mounting device to an enclosure of the first device. For example, a mounting device can be a portion (e.g., arm, attachment, protrusion, etc.) of a device that can be received directly by a cavity of the adaptor and connect the device to the back portion of the computing device monitor. In some examples, the mounting device can be attached to the device permanently. In some examples, the mounting device can be removable, as further discussed herein. Using the adaptor to couple the mounting device directly to the enclosure of a first device (e.g., computing device monitor), and couple a second device (e.g., thin client, mini desktop, other computing devices, etc.) to the first device can help improve the space of a workstation to which the devices are affixed.

Figure 2:
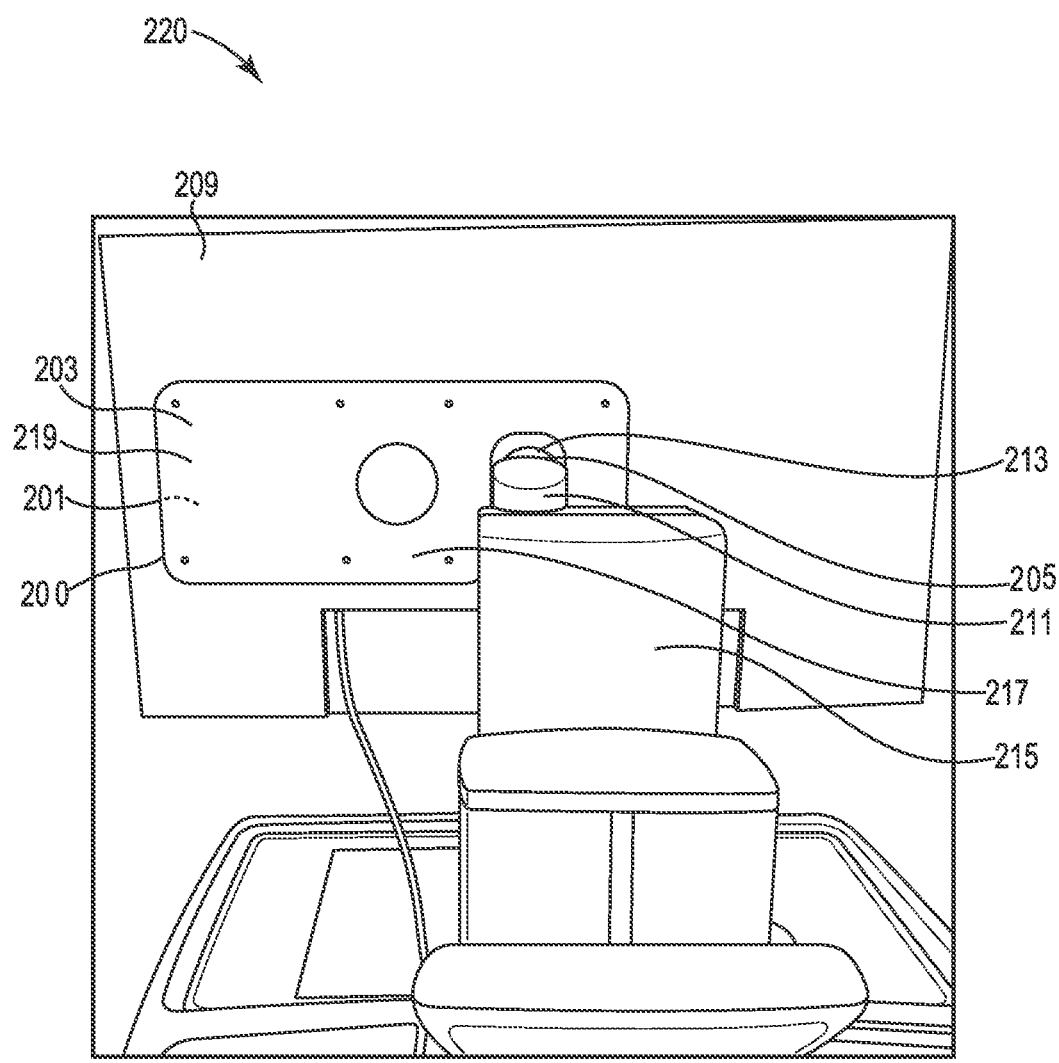
FIG. 2 illustrates an example of a system including a monitor, a mounting device, a mounting stand, and an adaptor with a cavity consistent with the disclosure.

FIG. 1A illustrates an example of an adaptor 100 with a cavity consistent with the disclosure. The adaptor 100 can include a first surface 101, a second surface 103, and a cavity 105. The cavity 105 extending through the adapter 100 can allow a mounting device (as illustrated in FIG. 2) to pass through the second surface 103 and the first surface 101 to be coupled to the enclosure of a first device (not shown in FIG. 1A).

The adaptor 100 with a cavity 105 can include a first surface 101. As used herein, the term "first surface" refers to the front-viewing surface of the adaptor 100, with respect to a device (e.g., a first device) that directly attaches to the device. The first surface 101 can be opposite to the second surface 103. As used herein, the term "second surface" refers to the back-viewing surface of the adaptor 100 that faces away from the device to couple to a peripheral device (e.g., a device other than the first device).

In some examples, the first surface 101 can lie to flush against a portion of the enclosure of the first device when the adaptor 100 is coupled to the enclosure of the first device. For example, the first surface 101 can be coupled to the back panel of a first device. The first device can include a computer monitor and the portion of the enclosure can include a back panel of the monitor. In some examples, the size of the monitor can be 40 centimeters (cm) wide and the first surface 101 of the adaptor 100 can be arranged/attached to a 20 cm portion of the surface width of the monitor when the adaptor 100 is coupled to the computing device (as shown in FIG. 2).

The adaptor 100 can include a second surface 103. The second surface 103 can be opposite to the first surface 101. For example, the second surface 103 can be the back-viewing surface of the adaptor that faces away from the first device and couples to an enclosure of the second device. For example, when the first surface 101 of the adaptor 100 is coupled to an enclosure of a computing device monitor, the second surface 103 of the adaptor 100 can be coupled to an enclosure of a second device (e.g., thin client, mini desktop, other computing devices, etc.). In this way, the adaptor 100 can be utilized to couple a computing device monitor to a second device.

Figure 3:
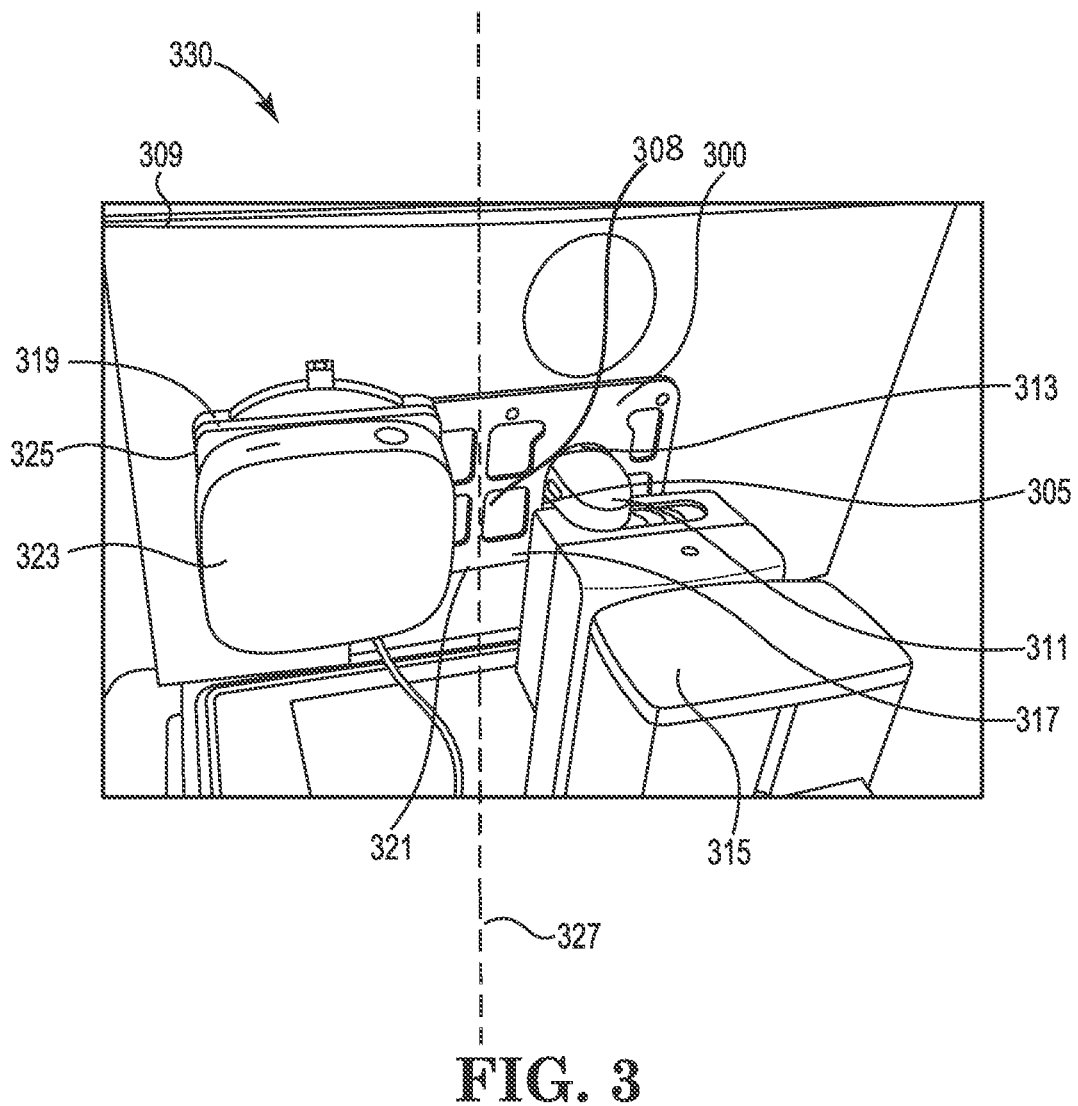
FIG. 3 illustrates an example of a system including an adaptor with a cavity, a monitor, a computing device, and a mounting device consistent with the disclosure.

Attachment mechanisms (e.g., screws, bolts etc.) can be utilized to couple the adaptor to the first device and the second device. In some examples, an attachment tab can be used to couple a device to the surface of another device using attachment mechanisms. As used herein, the term "attachment tab" refers to an adjustable bracket that can attach devices. For example, an attachment tab (as shown in FIG. 3) can be coupled to the enclosure of the second device as an intermediate component to attach the second surface 103 of the adaptor 100 to the second device. In some examples, the attachment tab can be adjustable to allow the second device to be coupled to the second surface 103 of the adaptor 100. For example, if a second device is 20 cm long and the second surface 103 of the adaptor 100 is 30 cm long, the length of the attachment tab can be extended to 30 cm to allow the 20 cm long second device to be coupled to the second surface 103 of the adaptor 100.

In some examples, the adaptor 100 can include a first side and a second side. In some examples, the first side can be positioned on a first side of a centerline and the second side can be positioned on a second side of a centerline of the adaptor. In some examples, the first side can include the cavity 105 and the second side can include a mounting area for the second device. In this way, the second device can be offset from the cavity 105 to prevent the second device from interacting with a mounting device positioned within the cavity 105.

In some examples, the first side can be an area surrounding a portion of a mounting area of a first device (e.g., computing device monitor, etc.). As described herein, the term "mounting area" refers to the area where a mounting device can be coupled to a first device through the cavity 105.

In some examples, the second device can be coupled to the second side of the adaptor 100 on the second surface 103 of the adaptor 100. In some examples, a device mount can be positioned on the second side of the adaptor 100, as further described herein. As used herein, the term "device mount" refers to an area of the adaptor to couple a peripheral device (thin client, mini desktop, other computing devices, etc.) to a device (e.g., enclosure of a first device). In some examples, the device mount can be positioned opposite to mounting area of the adaptor 100. In some examples, the device mount can include a plurality of apertures to couple more than one device to the second surface 103 of the adaptor 100. For example, the aperture 102 on device mount portion of the adaptor 100 can receive attachment mechanisms (screws, bolts, etc.). In some examples, the device mount portion of the adaptor 100 can have apertures in other shapes and patterns to couple a peripheral device. For example, adaptor 100 can include apertures (e.g., 308 as illustrated in FIG. 3) that can be square shape to receive a square shape surface of a computing device. In some examples, the device mount portion of the adaptor 100 can receive common mounting standard (e.g., VESA mounting bracket, etc.). In some examples, adaptor 100 can include a round shaped aperture 104 that can be used to insert a logo. The adaptor 100 can include a cavity 105. The cavity 105 is illustrated in FIG. 1A as a U-shape. As used herein, the term "U-shape" refers to a shape that resembles the letter U and has the shape of the vertical cross-section of a bell. Although a U-shape is illustrated, examples of the present disclosure are not limited to this shape. For example, the curved portion of the cavity 105 can be squared instead of curved to accommodate different mounting devices.

The cavity 105 extending through the adaptor 100 can receive and allow a mounting device to pass through. The mounting device can pass through the cavity 105 and the second surface 103 and the first surface 101 to be coupled to the enclosure of the first device. The cavity 105 can at least partially surround the mounting device when the mounting device is passed through the second surface 103 and the first surface 101 of the adaptor 100.

The size of the cavity 105 can be designed with different widths. In some examples, the size of the cavity can be designed based on the diameter of the of mounting device. For example, the diameter of the mounting device can be 6 cm. In this example, the size of the cavity 105 can be adjusted to 6.5 cm-7 cm to receive the 6 cm mounting device.

Figure 1B:
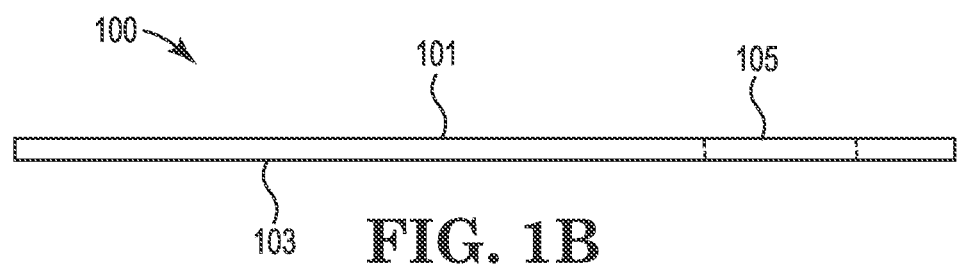
FIG. 1B illustrates an example top view of an adaptor with a cavity consistent with the disclosure.

FIG. 1B illustrates an example top view of an adaptor 100 with a cavity consistent with the disclosure. The adaptor 100 can include a first surface 101, a second surface 103, and a cavity 105. The cavity 105 can allow a mounting device to pass through the second surface 103 and the first surface 101 to be coupled to the enclosure of a first device (not shown in FIG. 1B). Using the adaptor 100 to couple the mounting device (directly to the enclosure of a first device (e.g., computing device monitor), and a second device (e.g., thin client, mini desktop, other computing devices, etc.) can help improve the space of a workstation to which the devices are affixed. Additionally, the ease of affixing and disengaging the adaptor 100 can allow the adaptor to be used in different devices.

A mounting device (e.g., 211 as illustrated in FIG. 2) can be an enclosure mount for a device that can be utilized to affix the device to a work surface (e.g., medical cart, desk, etc.). Based on the size of the cavity 105, the mounting device can be removed. The mounting device can be received directly through the cavity 105 of the adaptor 100. The mounting device can be surrounded by the cavity 105 to connect the mounting device to the back portion of a computing device monitor. For example, a mounting device can be a portion of a medical cart that can be received directly through a cavity 105 of the adaptor 100 and connect the medical cart to the back portion of the computing device monitor.

In some examples, the mounting device can be attached to an enclosure of a device. In some examples, when the mounting device is surrounded by the cavity 105 of the adaptor 100, a peripheral device can be attached to other portions of the adaptor 100, as further described herein. The adaptor 100 can be utilized to allow the mounting device to be directly coupled to the enclosure of a first device (e.g., computing device monitor) on a first side, and couple a second device (e.g., thin client, mini desktop, other computing devices, etc.) on a second side. This can help increase the workable space of a workstation (medical cart, etc.). The additional workspace can, for example, hold tools, computing devices, or other devices associated with the workspace. This can also eliminate the use of an additional workspace, which can help reduce cost.

FIG. 2 illustrates an example of a system 220 including a monitor 209, a mounting device 211, a mounting stand 215 and an adaptor 200 with a cavity 205 consistent with the disclosure. System 220 can include a mounting area 213, where the mounting device 211 can be coupled to the monitor 209. The cavity 205 of the adaptor 200 can be positioned on a first side 217 of the adaptor 200, and a device mount 219 can be positioned on a second side of the adaptor 200. Adaptor 200 can include a first surface 201 and a second surface 203.

System 220 can include a monitor 209. Monitor 209 can be a monitor device of a computing device, a medical device, a gaming device, etc., that can be used to display images generated by a computing device. In some examples, the monitor 209 can be part of a workstation. Monitor 209 of the system 220 can have an enclosure with a mounting area 213. In some examples, the mounting area 213 can be an enclosure of the monitor 209 where the mounting device 211 can be coupled to the monitor 209. Said differently, the portion of the monitor 209 within the cavity 205 can be the mounting area 213. In some examples, the mounting device 211 can be coupled to the mounting area 213 to couple the monitor 209 to a mounting stand 215. In some examples, the cavity 205 can be positioned on a first side of the adaptor 200 to surround a portion of the mounting area 213.

System 220 can include a mounting device 211. In some examples, the mounting device 211 can be coupled to the mounting area 213 to couple the monitor 209 to a mounting stand 215. In some examples, the mounting device 211 can be an independent device that can be coupled to a workstation via a mounting stand 215, as further described herein. The apparatus 250 can be an external device that can be part of a medical cart, for example. In some examples, the mounting device 211 can be a removable portion that can be coupled to and removed from the mounting stand 215. In some examples, the mounting device 211 can be a fixed and extended portion of the mounting stand 215.

The mounting device 211 of the system 220 can pass through a second surface 203 and the first surface 201 of the adaptor 200. In some examples, passing through the second surface 203 can allow the mounting device 211 to couple to the enclosure of the first device. For example, when the first surface of the adaptor 200 is coupled to the monitor 209 having an enclosure with the mounting area 213, the mounting device 211 can pass through the second surface 203. Passing through the second surface 203 can allow the mounting device 211 to couple directly to the monitor 209.

System 220 can include a mounting stand 215. In some examples, a portion of the mounting device 211, different from the portion coupled to the monitor 209, can be coupled to the mounting stand 215. In some examples, the mounting area 213 can be an area of the monitor 209 where the mounting device 211 can be coupled to monitor 209. In some examples, the mounting device 211 can be coupled to the mounting area 213 to couple the monitor 209 to a mounting stand 215.

System 220 can include an adaptor 200. Adaptor 200 can be analogous to the adaptor 100 as described in relation to FIGS. 1A and 1B. The adaptor 200 can include a first surface 201 a second surface 203 and a cavity 205. The cavity 205 can allow the mounting device 211 to pass through the adaptor 200 to be coupled to the enclosure of a first device (e.g., monitor 209, etc.).

In some examples, an attachment tab (e.g., attachment tab 325 as illustrated in FIG. 3) can be coupled to the second surface 203 of the adaptor 200 to allow a second device to be coupled with the monitor 209. In some examples, the attachment tab can be adjustable to allow the second device to be coupled to the second surface 203 of the adaptor 200. For example, the attachment tab can be adjusted by expanding and/or retracting from a first position to a second position to allow the second device to be coupled to the adaptor 200, as further described herein.

In some examples, the adaptor 200 can include a first side and a second side. In some examples, the first side can be positioned on a first side of a centerline (e.g., area right of the line 327 as illustrated in FIG. 3) of the adaptor 200 and the second side can be positioned on a second side of a centerline of the adaptor 200 (e.g., area left of the line 327 as illustrated in FIG. 3). In some examples, a computing device (e.g., computing device 323 as illustrated in FIG. 3) can be coupled to the second side of the adaptor 200. In some examples, the device mount 219 can be positioned on the second side of the adaptor 200. Device mount 219 can be an area of the adaptor 200 to couple a peripheral (other computing devices, thin client, mini desktop, etc.) to the monitor 209. In some examples, the device mount 219 can couple the computing device to the adaptor 200.

Device mount 219 can refer to an area of the adaptor 200 that is to couple a peripheral device (thin client, mini desktop, other computing devices, etc.) to the monitor 209. In some examples, the device mount 219 can include a plurality of apertures to couple more than one device. In some examples, the device mount 219 can be on the second side of the adaptor 200. In some examples, the second side of the adaptor 200 can receive an attachment tab (e.g., attachment tab 325 as described in relation to FIG. 3) to couple the second device to the second surface 203 of the adaptor 200. In some examples, the device mount 219 of the adaptor 200 can include a plurality of apertures to allow more than one computing device to be coupled to the adaptor 200.

FIG. 3 illustrates an example of a system 330 including an adaptor 300 with cavity 305, a monitor 309, a computing device 323, and a mounting device 311 consistent with the disclosure. Adaptor 300 can include a cavity 305 on a first side 317, and a device mount 319 on a second side 321. The adaptor 300 can include a first surface 301 (not shown in FIG. 3), and a second surface 303 (not shown in FIG. 3). The monitor 309 can include a mounting area 313 to be coupled to the adaptor 300 via the first surface 301 of the adaptor 300.

System 330 can include an adaptor 300. The adaptor 300 can include a first surface 301, a second surface 303, and a cavity 305. The cavity 305 is in a form of a U-shape that resembles the letter U and has the shape of the vertical cross-section of a bell, as illustrated in FIG. 3. For example, the cavity 305 can have two edges that are connected by a curve to form the shape of the letter U. In some examples, the cavity can extend from an edge of the adaptor 300 and form a curve within an interior portion of the adaptor 300 to form the shape of the letter U. Although a U-shape is illustrated, examples of the present disclosure are not limited to this shape. For example, the curved portion of the cavity 305 can squared instead of curved. The cavity 305 can allow a mounting device 311 to pass through the adaptor 300. The mounting device 311 can pass the second surface 303 and the first surface 301. Adaptor 300 can include a cavity 305 on a first side 317 of the adaptor 300, and a device mount 319 on a second side 321. Device mount 319 can be coupled to the enclosure of the monitor 309. In some examples, the cavity 305 can be positioned on the first side of the adaptor 300.

In some examples, the adaptor 300 can include a first side 317 of the adaptor 300. In some examples, the first side 317 can be positioned on a first side of a centerline (e.g., line 327, etc.) of the adaptor 300. For example, if the line 327 is determined to be the centerline of the adaptor 300, the side to the right of line 327 can be the first side 317. In some examples, the first side 317 can include mounting area 313.

In some examples, the first side 317 can house the cavity 305 of the adaptor 300. The adaptor 300 can include a second side 321. In some examples, the second side 321 can be positioned on a second side of the centerline (e.g., line 327, etc.) of the adaptor 300. For example, if line 327 is determined to be the centerline of the adaptor 300, the side left to the line 327 can be the second side 321. In some examples, the first side 317 and the second side 321 can be positioned on the same surface of the adaptor 300 (e.g., second surface 321, as referenced herein). The computing device 323 can be coupled to the second side 321 of the adaptor 300. In some examples, the device mount 319 can be positioned on the second side 321 of the adaptor 300. Device mount 319 can be an area of the adaptor 300 that can couple a peripheral device to the computing device.

In some examples, the device mount 319 can be located opposite to the mounting area 313. In some examples, the second side 321 of the adaptor 300 can receive an attachment tab 325 to couple the computing device 323 to the second surface 303 of the adaptor 300.

Monitor 309 of the system 330 can include a mounting area 313. In some examples, the mounting area 313 can be an area of the monitor 309 where the mounting device 311 can be coupled to the monitor 309 through the cavity 305. In some examples, the mounting device 311 can be coupled to the mounting area 313 to couple the monitor 309 to a mounting stand 315.

The monitor 309 is removeable from the mounting device 311 when the adaptor 300 is coupled to the monitor 309. As used herein, the term removable refers to being able to decouple or remove a first device from a second device. For example, the first surface 301 of the adaptor 300 can be coupled to the monitor 309. In this example, the monitor 309 can be removable from the mounting device 311 when the adaptor 300 is coupled to the monitor. In some examples, the monitor 309 can be removed from the mounting device 311 to couple cavity 305 of the adaptor 300 a mounting device different from the mounting device 311.

The system 330 can include the adaptor 300 with a cavity 305 on a first side 317 and a device mount 319 on a second side 321. In some examples, the second side 321 of the adaptor 300 can receive an attachment tab 325 to couple the second surface 303 of the adaptor 300 to attach devices to the second surface 303.

In some examples, the adaptor 300 can be coupled to the computing device 323 based on a diameter of the mounting device 311 to be received via the cavity 305 of the adaptor 300. For example, the diameter of the mounting device 311 can be 6 cm. Based on the size of the mounting device 311, the size of cavity 305 of the adaptor 300 can be adjusted to 6.5 cm-7 cm to receive the 6 cm mounting device 311.

The second side 321 of the adaptor 300 can receive an attachment tab 325 to couple to the second surface 303 of the adaptor 300 to attach devices to the second surface 303. In some examples, the attachment tab 325 can attach the monitor 309 to the peripheral device 323. The attachment tab 325 can be intermediate component that can be positioned between the adaptor 300 and the computing device 323. For example, the first surface 301 of the adaptor can be coupled to the monitor 309, and the second surface 303 of the adaptor 300 can be coupled to the peripheral device 323. In this example, the attachment tab 325 can be positioned between the adaptor 300 and the computing device 323 to attach the computing device 323 to the monitor 309. The attachment tab 325 can be adjustable to allow the computing device 323 to be coupled to different locations along the second surface 303 of the adaptor 300. For example, the length of the attachment tab 325 can be 18 cm. If the computing device 323 is 14 cm, then the attachment tab 325 can be adjusted to 14 cm to allow the computing device 323 to be coupled to the adaptor 300. In some examples, if the second side 321 of the adaptor 300 can have 10 cm of space to couple a 14 cm computing device 323. The length of the attachment tab 325 can be adjusted to 10 cm to allow the computing device 323 to couple to the second side 321 of the adaptor 300. The attachment tab 325 can be adjusted by expanding and/or retracting the attachment tab 325 from a first position to a second position.

The above specification, examples and data provide a description of the method and applications and use of the system and method of the disclosure. Since many examples can be made without departing from the spirit and scope of the system and method of the disclosure, this specification merely sets forth some of the many possible example configurations and implementations.

The Figures herein follow a numbering convention in which the first digit corresponds to the drawing Figure number and the remaining digits identify an element or component in the drawing. For example, reference numeral 101 can refer to element 101 in FIG. 1A and an analogous element can be identified by reference numeral 301 in FIG. 3. Elements shown in the various Figures s herein can be added, exchanged, and/or eliminated to provide additional examples of the disclosure. In addition, the proportion and the relative scale of the elements provided in the Figures are intended to illustrate the examples of the disclosure, and should not be taken in a limiting sense.

It can be understood that when an element is referred to as being "on," "connected to", "coupled to", or "coupled with" another element, it can be directly on, connected, or coupled with the other element or intervening elements can be present. In contrast, when an object is "directly coupled to" or "directly coupled with" another element it is understood that are no intervening elements (adhesives, screws, other elements), etc.

What is claimed:

1. An adaptor, comprising:
a first surface to be coupled to an enclosure of a monitor;
a second surface opposite to the first surface to be coupled to an enclosure of a computing device, wherein the computing device is coupled to a device mount located on a first side of a centerline of the adaptor; and
a U-shaped cavity, positioned on a second side of the centerline of the adaptor, extending through the adaptor to allow a mounting device to pass through the second surface and the first surface to be coupled to the enclosure of the monitor, wherein the U-shaped cavity extends from an edge to an interior portion of the adaptor.

2. The adaptor of claim 1, wherein the computing device is positioned behind the monitor when the computing device is coupled to the device mount of the adaptor.

3. The adaptor of claim 1, wherein the second surface couples a plurality of devices including the computing device.

4. The adaptor of claim 1, wherein the first surface is to lie flush against a portion of the enclosure of the monitor when the adaptor is coupled to the enclosure of the monitor.

5. The adaptor of claim 1, wherein the U-shaped cavity allows the adaptor to be removed from the monitor without removing the mounting device from the monitor.

6. The adaptor of claim 1, wherein an attachment tab is utilized to couple the enclosure of the computing device to the second surface of the adaptor.

7. The adaptor of claim 1, wherein the U-shaped cavity is to receive and at least partially surround the mounting device when the mounting device is passed through the second surface and the first surface of the adaptor.

8. A system comprising:
   a monitor having an enclosure with a mounting area;
   a mounting device to be coupled to the mounting area to couple the monitor to a mounting stand; and
   an adaptor comprising:
      a U-shaped cavity positioned on a first side of a centerline of the adaptor to surround a portion of the mounting area when the adaptor is coupled to the enclosure of the monitor, wherein the U-shaped cavity extends from an edge to an interior portion of the adaptor on the first side of the centerline; and
      a device mount positioned on a second side of the centerline of the adaptor to couple a computing device to the enclosure of the monitor when the adaptor is coupled to the enclosure of the monitor.

9. The system of claim 8, wherein a size of the U-shaped cavity is based on a width of the mounting device.

10. The system of claim 8, wherein the device mount of the second side of the centerline of the adaptor includes a plurality of apertures to allow a plurality of computing devices to be coupled to the adaptor.

11. A system, comprising:
   an adaptor with a U-shaped cavity on a first side of a centerline and a device mount on a second side of the centerline, wherein the U-shaped cavity extends from an edge to an interior portion of the adaptor;
   a monitor with a mounting area to be coupled to the adaptor via a first surface of the adaptor;
   a computing device to be coupled to the adaptor via a second surface of the adaptor, wherein the computing device is coupled to the device mount on the second side of the centerline; and
   a mounting device to be passed through the second surface and the first surface of the adaptor via the U-shaped cavity on the first side of the centerline to connect a mounting stand to the mounting area of the monitor.

12. The system of claim 11, wherein the monitor is removeable from the mounting device when the adaptor is coupled to the monitor.

13. The system of claim 11, wherein the adaptor is coupled to the computing device based on a diameter of the mounting device to be received via the U-shaped cavity of the adaptor.

14. The system of claim 11, wherein the second side of the adaptor receives an attachment tab to couple the computing device to the second surface of the adaptor.

15. The system of claim 14, wherein the attachment tab is adjustable to allow the computing device to be coupled to different locations along the second surface of the adaptor.

* * * * *